Jan. 2, 1945.  H. W. BARTHOLOMEW  2,366,475
DIE FOR DIE-CASTING
Filed June 25, 1942  3 Sheets-Sheet 1
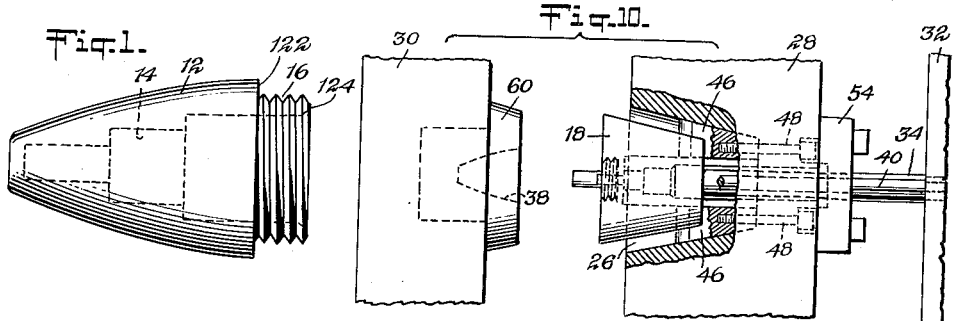
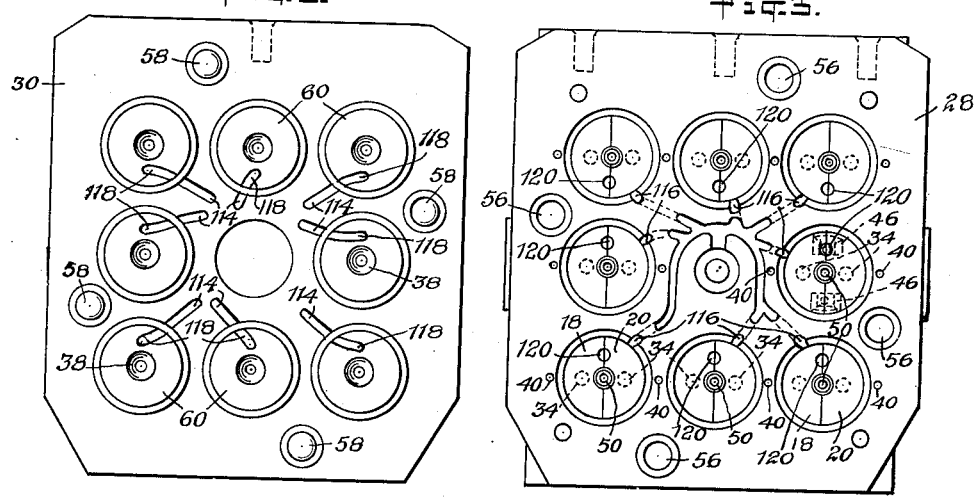
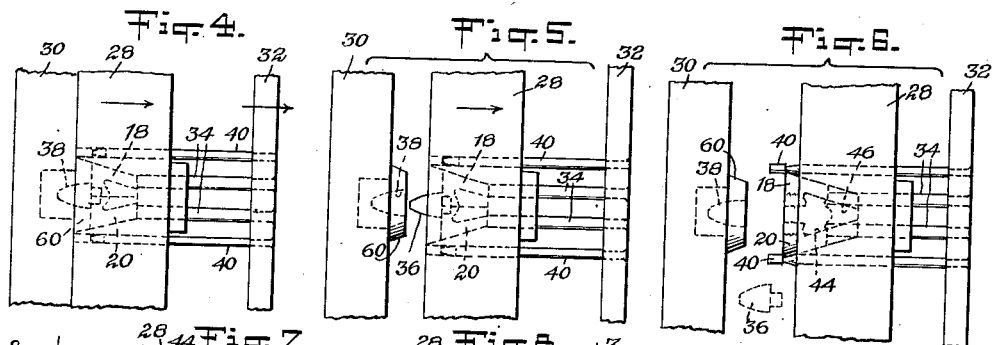
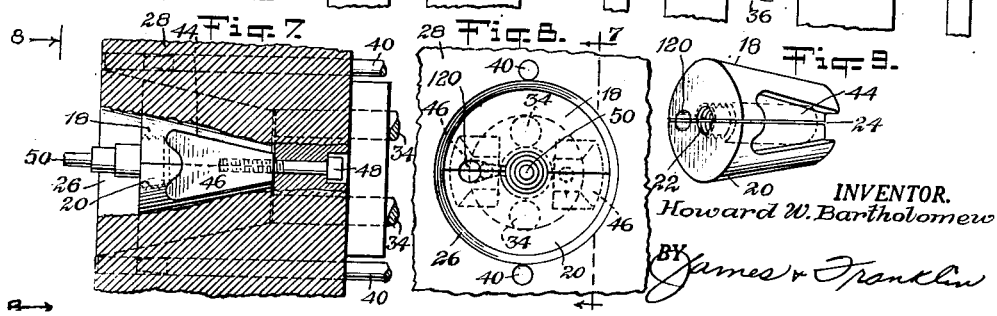
INVENTOR.
Howard W. Bartholomew
BY James & Franklin
ATTORNEYS

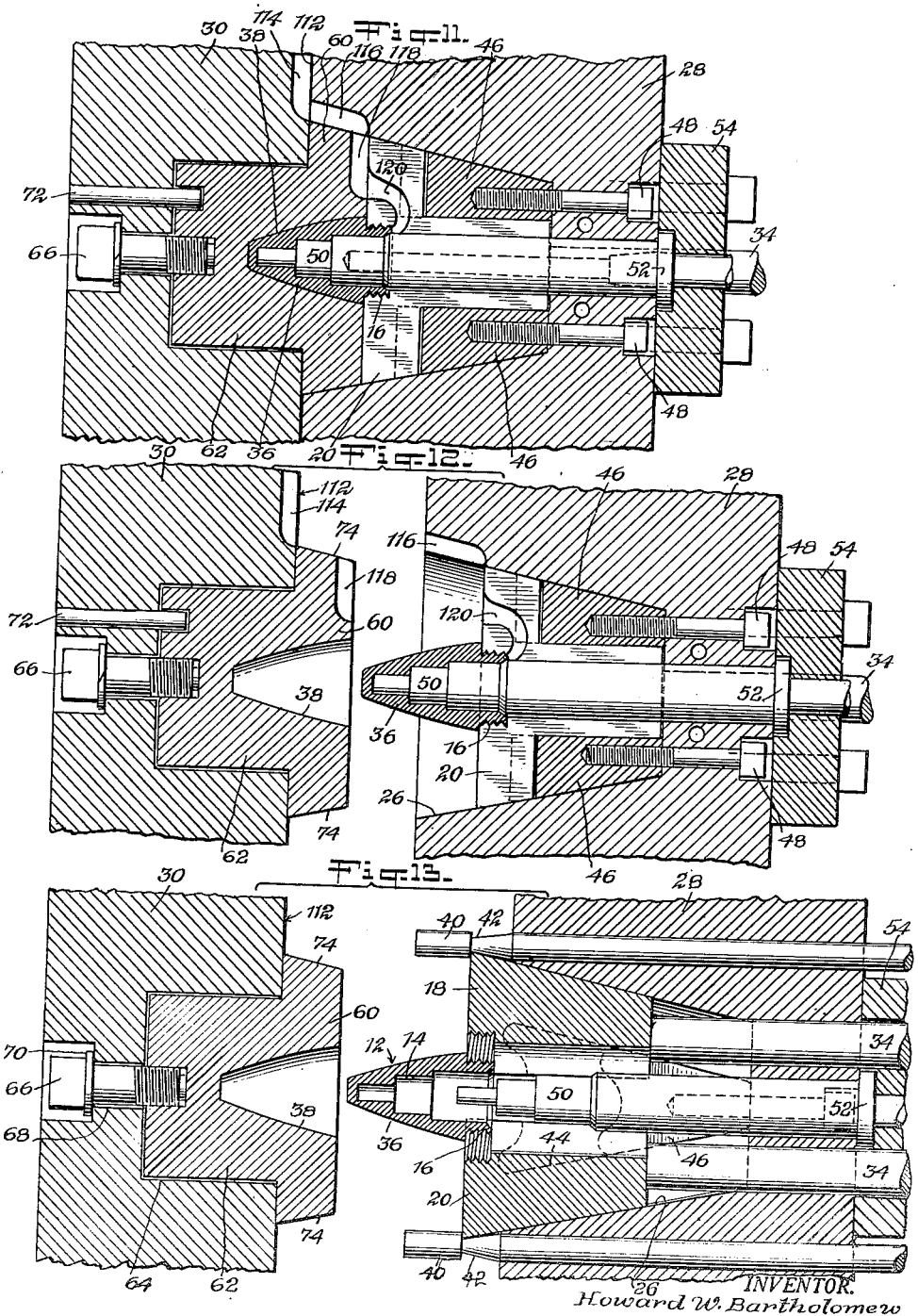

Jan. 2, 1945.   H. W. BARTHOLOMEW   2,366,475
DIE FOR DIE-CASTING
Filed June 25, 1942   3 Sheets-Sheet 3
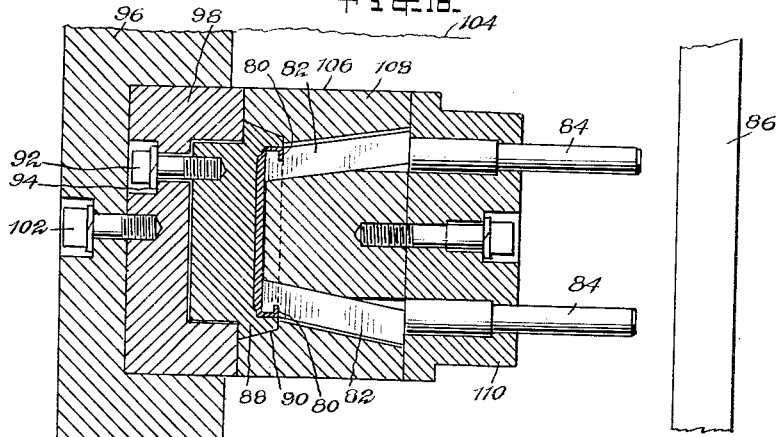
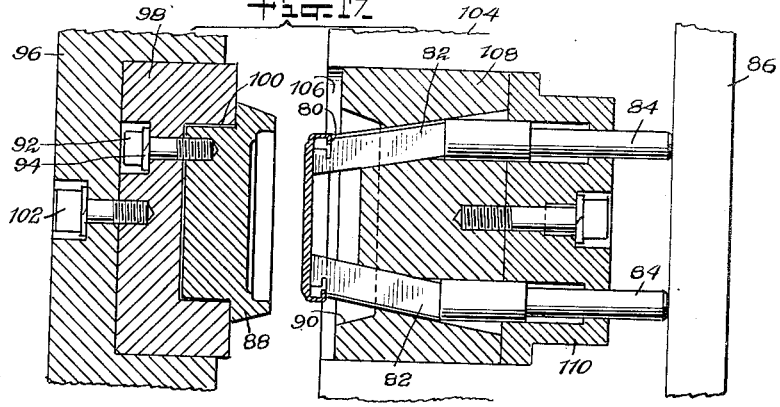
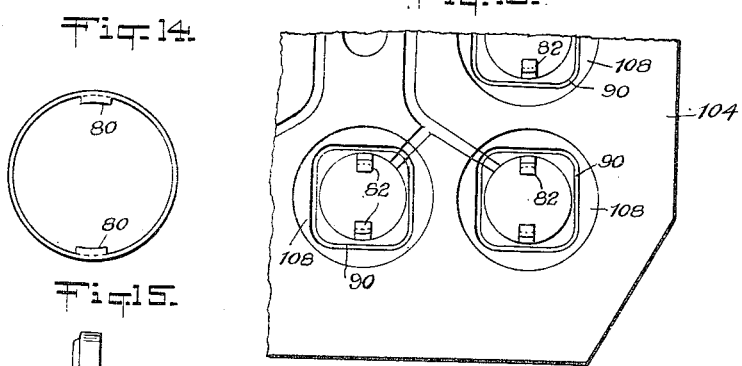
INVENTOR.
Howard W. Bartholomew
BY
James & Franklin
ATTORNEYS Patented Jan. 2, 1945

2,366,475

UNITED STATES PATENT OFFICE 2,366,475

DIE FOR DIE-CASTING

Howard W. Bartholomew, Pottstown, Pa., assignor to Doehler Die Casting Company, Toledo, Ohio, a corporation of New York Application June 25, 1942, Serial No. 448,378

14 Claims. (Cl. 22—149)

This invention relates to dies for the molding of molded articles.

The primary object of my invention is to generally improve dies of the character specified. Such dies ordinarily comprise a cover die and an ejector die which are separable on a parting face. For economy and high production output, the die is usually provided with multiple cavities for the simultaneous molding of a plurality of pieces. Each piece is formed in complementary cavities located partly in the cover die and partly in the ejector die. Often a core is provided on one half or the other of the die to produce a thin-walled, hollow article. It is important for accurate work that the individual cavities or cores of the cover die be accurately aligned with the complementary cavities or cores of the ejector die. With multiple cavity dies, slight errors may develop due to unequal thermal expansion of the cover die and the ejector die. The temperatures may differ, or the expansion for a given temperature rise may differ.

One primary object of my invention is to overcome the foregoing difficulty, and to provide an improved die in which the complementary parts of the cover die and ejector die will always be dependably, accurately aligned despite inequalities in thermal expansion, or other errors tending to cause equivalent misalignment.

Frequently a piece might be best molded in a single advantageous position, as for example, with the axis of the piece perpendicular to the parting face of the die, were it not for some small but important part of the piece which acts as an undercut when the piece is thus positioned. One example is the case of a screw thread which ordinarily would have to be molded with its axis lying in the parting face of the mold, but which may be found on a cylindrical or conical piece which, if it were not for the thread, could be most readily and advantageously molded with its axis perpendicular to the parting face of the mold. A further object of the present invention is to provide an improved die so arranged as to make it possible to mold undercuts in the circumstances here outlined.

A specific example of a molding problem which is nicely solved by the present invention is the nose for a projectile. The nose is approximately frustro-conical in shape, and is provided with a threaded shank at the large end or base. The nose is hollowed by means of a core extending axially of the same. Such a piece can best be molded with the axis perpendicular to the parting face of the die, in which case a large number may be molded at each operation, and the nose of the projectile will be formed without any fins extending longitudinally thereof, thus dispensing with the need for machining. A thread may be cast accurately enough by die-casting methods to make machining unnecessary. However, the thread constitutes an undercut if the piece is molded with its axis perpendicular to the parting face. Moreover, it is absolutely essential for proper balance and spin of the projectile in flight, that the core or hollow interior be perfectly concentric with the exterior. Also, if machining is to be avoided, it is essential that the threaded shank be absolutely concentric with the nose of the projectile. As will hereinafter be described in detail, all of these requirements are readily fulfilled by using the improved die of the present invention.

To the accomplishment of the foregoing general objects, and other more specific objects which will hereinafter appear, the present invention consists in the die elements and their relation one to the other, as hereinafter are more particularly described in the specification and sought to be defined in the claims. The specification is accompanied by drawings in which:

Fig. 1 is an elevation of a piece to be molded;

Fig. 2 is a view looking toward the parting face of the cover die;

Fig. 3 is a view looking toward the parting face of the ejector die;

Figs. 4, 5 and 6 are fragmentary side elevations illustrating successive stages in the opening of the die;

Fig. 7 is a partially sectioned elevation through a portion of the ejector die, and is taken approximately in the plane of the line 7—7 of Fig. 8;

Fig. 8 is a view looking in the direction of the arrows 8—8 of Fig. 7;

Fig. 9 is a perspective view showing the ejectors or split insert used in the ejector die;

Fig. 10 is a partially sectioned elevation showing the die in open or ejection position, the plane of Fig. 10 being perpendicular to the plane of Figs. 4 through 7;

Fig. 11 is a section through the die in closed position;

Fig. 12 is a section through the die in partially opened position;

Fig. 13 is a section through the die in fully opened position, the plane of this section being perpendicular to that of Figs. 10, 11 and 12, and being parallel to that of Figs. 4 through 7;

Figs. 14 and 15 illustrate a different product which may be molded in a die embodying features of my invention;

Fig. 16 is a fragmentary section through the die in closed position;

Fig. 17 is a similar section showing the die in open position; and

Fig. 18 is an elevation showing one corner of the ejector die looking toward the parting face.

Referring to the drawings, and more particularly to Fig. 1, the piece to be molded is a nose for a projectile, more specifically, for an anti-craft shell. It has a somewhat frustro-conical body 12 which is hollowed in steps, as is indicated at 14. A threaded shank 16 is formed integrally with the body 12. Inasmuch as these are made in enormous quantities, a substantial saving can be effected if the piece can be molded in finished form without machining. Ordinarily, a piece of this kind would be finished in a lathe or screw machine for completion of the thread, the piece being screwed later into a chuck by means of the thread, and the body 12 then being turned for perfect concentricity with the thread. For proper balance of the projectile, the hollow interior should also be true or concentric with the exterior.

On reflection, it will be observed that to make the thread 16, the piece should be molded with its axial parallel to or lying in the parting face of the die. That would, however, raise two difficulties. One is the production of a fin extending longitudinally at each side of the body. To remove this fin would require a finishing operation. Another difficulty is that a retractible core would be needed to form the hollow interior. Both of these difficulties are readily avoidable by molding the piece with its axis perpendicular to the parting face of the die, but in that case, the threads 16 become undercuts.

Referring now to Fig. 9, the threaded portion may be molded between separable inserts or ejectors 18 and 20, the female thread for this purpose being shown at 22. The parts 18 and 20 are separable on a diametrical plane at 24, and are together frustro-conical in shape. They are received in a mating, relatively deep, frustro-conical recess in the ejector die, as will be seen at 26 in Figs. 7 and 8. When the ejectors 18 and 20 are forced all the way into the receptive recess, they are held tightly together, as shown in Figs. 7 and 8. For ejection purposes, they may, however, be pushed outwardly, as shown in Fig. 10, and at this time the two halves or ejectors may be spread apart, as is most clearly shown in Fig. 13. This disengages the undercut or threaded portion, and so permits discharge of the molded piece. From this viewpoint, it may be said that the parts 18 and 20 are slidable parts which are provided with guides to move the same in an angular direction relative to the parting face of the die. These angularly slidable parts function to form the undercut in the molded piece when in the inward position shown in Figs. 7 and 8, but they serve to both eject the molded piece and to free the undercut when in the outward position shown in Figs. 6, 10 and 13.

The ejectors are most conveniently moved from inward to outward position by using pins connected to an ejector plate and functioning much like ejector pins. This will be clear from comparison of Figs. 4, 5 and 6. In Fig. 4 the ejector die 28 is closed against the cover die 30. The ejectors 18 and 20 are in their inner position. The ejector plate 32 carrying the ejector pins 34 is spaced from the ejector die 28. As the ejector die 28 moves away from the cover die 30, the ejector plate 32 at first moves with the ejector die. The ejectors 18 and 20 remain seated in the ejector die. They hold the molded piece 36 securely because of the interlocked or undercut relation of the threads. The piece is therefore readily stripped from the cavity 38 in the cover die. Referring now to Fig. 6, as the ejector die continues its opening movement toward the right, the ejector plate 32 strikes an appropriate stationary abutment, thereby arresting its movement while the movement of the ejector die 28 continues. This closes the space between the ejector die 28 and the ejector plate 32, or causes relative movement of the ejector pins 34 toward the left. These pins bear against the inner ends of the ejectors 18 and 20, thereby pushing them from the inward position shown in Figs. 4 and 5 to the outward position shown in Fig. 6. Because of certain guides or cams hereinafter described, the outward movement of the ejectors 18 and 20 is accompanied by a separation of the same, thus freeing the molded piece 36 and enabling it to fall or be removed from the die.

The outward movement of the ejectors 18 and 20 may be limited by safety pins 40 which are also connected to the ejector plate 32. These pins fulfill the usual function of forcing back or insuring retraction of the ejector plate 32 when the die is closed, as shown in Fig. 4. In the present case, however, they are tapered within their ends and are so positioned that the outer edges of the ejectors 18 and 20 are received therein in the open position of the die shown in Fig. 6. This is more clearly illustrated in Fig. 13 in which the tapered portions 42 of the safety pins 40 are shown receiving and holding the ejectors 18 and 20 against possible escape from the frustro-conical recess 26 in which the ejectors operate. Fig. 13 also shows how the ejector pins 34 bear slidably against the inner ends of the ejectors 18 and 20, but are not fixedly connected thereto.

The guides or cams for causing angular movement of the ejectors are received within paired recesses, one pair of which is indicated at 44 in Fig. 9. There is a similar pair on the opposite side. One recess of each pair is formed in ejector 18 and the other in ejector 20. The guide or cam itself is a block 46 (Fig. 7), held in position within the frustro-conical recess 26 by means of a bolt 48. Upon outward movement of the ejectors 18 and 20, they are constrained to move angularly, and therefore to separate from one another, as will be clear from comparison of Figs. 7 and 13, or from comparison of Figs. 5 and 6. The cross-sectional shape of the guides or cams 46 is shown in Figs. 11 and 12. This section also illustrates the bolts 48 which lock the guides in position. The unsectioned surface of the ejector 20 is the flat face of the ejector remote from the observer, the nearer ejector being removed. The two ejectors are separated in the same plane as the section of the drawing. This is in contrast with Fig. 10, in which the nearer ejector 18 has been left in position, instead of being assumed removed. In Fig. 10 the ejectors are shown in the outward or ejection position. The ejector 20 shown in Figs. 11 and 12 is not shown in Fig. 10 because it is located in back of the ejector 18 and is concealed thereby. The cams 46 are disposed between the ejectors 18 and 20, and remain in fixed position, being locked by the bolts 48.

The ejector die also carries the core 50 (Figs. 7 and 8) for shaping the hollow interior of the piece. When the piece is molded in the position here illustrated, the core may be a stationary core, and the construction of the same is best shown in Figs. 11, 12 and 13, it consisting of a rod the working end of which is stepped and properly dimensioned, while the opposite end is flanged at 52 and locked in position between the back wall of the die and a backing plate 54. In accordance with usual practice, the core may be hollowed and arranged for water-cooling.

The ejectors 18 and 20 fit closely about the intermediate body of the core when they are in their inner position. They are, of course, separated from the core, as shown in Fig. 13, when pushed to outer position. As they are pushed to outer position, they move the molded piece outwardly, and thus strip it from the core, as is also shown in Fig. 13.

So far, the description has been confined to a single mold cavity. Referring now to Figs. 2 and 3, it will be seen that actually, the die is a multiple-cavity die, and in the specific case there illustrated, there are eight cavities surrounding a central gate. The metal flows outwardly from the gate to the different cavities, the gate passages lying generally along the parting face of the die, but some parts may be located in the ejector die, and other parts in the cover die, as shown, depending on convenience. It will also be understood that appropriate ejector pins are provided, distributed along the gate passages, to eject the solidified gate metal at the same time that the molded pieces are ejected by the ejectors. These conventional ejector pins have been omitted in order to simplifying the drawings. Fig. 3 shows the ejector die, and the ejectors 18 and 20, the core 50, the ejector pins 34, and the safety pins 40, are all indicated on the drawings. The bushed holes 56 are for the dowels 58 shown on the cover die in Fig. 2.

One difficulty with a multiple-cavity mold is the possibility of unequal expansion of the cover die relative to the ejector die. It is difficult to so adjust the cooling as to maintain both halves of the die at the same temperature, and even if maintained at the same temperature, there may be a difference in expansion. This may cause a slight misalignment of the cavity in the cover die relative to that in the ejector die, which in the present case would correspond to a slight eccentricity of the body 12 (Fig. 1) of the piece relative to the threaded shank 16 and the hollow interior 14. In accordance with a further feature of my invention, this difficulty is overcome by using floatingly mounted plugs on the cover die. Referring to Fig. 13, it will be seen that the cavity 38 is formed in a plug 60, instead of being formed directly in the cover die 30. The plug 60 has an inner portion 62 received in a recess 64 formed in the cover die 30. The recess is somewhat larger than the plug portion 62, thereby affording lateral movement of the plug, i. e., movement in the direction of the parting face of the die.

The plug is held on the die by means of a bolt 66 passing through an oversized opening 68 in the cover die. and threadedly received in plug 60. A spring washer 70 is preferably placed beneath the head of bolt 66. This may be a lock washer, but the edges are preferably ground smooth. The bolt 66 is tightened only enough to partially but not wholly flatten the washer 70. In fact, I recommend that the end of the bolt seat against the plug 60 before the washer 70 is flattened, thus preventing excessive tightening of the bolt by a careless workman. With this construction it will be evident that the plug is capable of a slight self-adjustment or lateral movement.

If desired, rotation of the plug may be prevented by using a dowel pin 72 (Fig. 12) which is received in a mating or somewhat oversized hole in plug 60. To insure proper alignment of the plug with the ejector die, the plug includes an outer or projecting portion 74 which is tapered or frustro-conical in configuration. This part is dimensioned to accurately fit within the outer portion of the frustro-conical recess 26 in the ejector die. Thus, when the die is closed from the position shown in Fig. 12 to that shown in Fig. 11, the portion of plug 60 which projects from the parting face of the cover die is received in the mating recess of the ejector die. This insures absolute concentricity of the two parts despite unequal thermal expansion of the cover die and the ejector die. Incidentally, it will be understood that the plug 60 bears tightly against the outer face of the plug, which in turn terminates the same to innermost position, at which time the surrounding conical recess operates to force them tightly against one another. In this way the entire die cavity is closed with a minimum of fin and leakage.

The gating of the die for flow of metal to the cavities may be varied, but a preferred form of gating is illustrated in the drawings. Referring first to Figs. 11 and 12, it will be seen that metal flows along the parting face 112 of the die through a passage 114, and thence transversely through a passage 116 running alongside the frustro-conical plug, the passage 116 being cut in the ejector die. This communicates with a passage 118 cut in the outer face of the plug. which in turn terminates at and communicates with a reversely curved passage 120 which leads into the open end of the threaded part of the projectile nose. The passage 120 is formed at the diametrical split between the two ejectors 18 and 20, and may be cut into either ejector, or preferably both. However, the passages 114, 116 and 118 do not normally lie in the plane of the section shown in Figs. 11 and 12, and have been shown that way only for clarity.

The manner in which passage 120 may be cut into the opposed faces of the ejectors, is shown at 120 in Fig. 9, and also at 120 in Fig. 3. Fig. 3 further shows the manner in which transverse passages 116 are cut into the side of the frustro-conical recess in the ejector die. Fig. 2 shows the passages or channels 114 cut on the parting face of the cover die, and leading to the peripheries of the frustro-conical plugs. When the die is closed these passages communicate with the passages 116 shown in Fig. 3. Fig. 2 also shows the passages or channels 118 cut into the flat outer faces of the frustro-conical plugs. When the die is closed, these communicate at their outer ends with the passages 116 shown in Fig. 3, and their inner ends terminate over the passages 120 shown in Fig. 3. In this way the flow of metal from the central gate is completed to each of the die cavities.

The reason that gating to the end of the threaded piece is preferred. is that it minimizes machining. Specifically, after the gate and piece are broken apart. the piece is subjected to a facing operation which faces the end of the piece, thus cleaning away any remnant of the gate. In actual practice, the facing operation is preferably performed simultaneously with two tools or bits, one of which faces the base 122 (Fig. 1) of the piece, while the other faces the end 124 of the piece. This is the only and entire cleaning operation required for the finished piece. No machining is required for the thread 16, nor for the ogival surface 12.

The principles underlying the present invention are, of course, not limited to the particular product so far described. The molding of a wholly different product is illustrated in Figs. 16, 17 and 18. The piece to be molded is shown in Figs. 14 and 15, it being a dished, circular cap of very simple form, except for the provision of two inwardly projecting tongues 80. Were it not for the tongues, it would be a very simple matter to mold this product with its axis perpendicular to the parting face of the die. However, the tongues 80 then become undercuts which would prevent stripping of the piece from the mold.

Referring to Figs. 17 and 18, this difficulty is taken care of by providing the ejector die with angularly slidable parts 82. These are appropriately shaped at their outer ends to form the undercuts or tongues 80. Fig. 16 shows the parts in retracted or molding position. When the die is opened, the parts 82 are slid outwardly, as shown in Fig. 17, in which case they may be used both as ejectors and also to disengage or free the undercuts.

In the present case, the slidable parts are moved by pins 84. When the die is opened, these bear against a stationary plate 86. It will be noted in Fig. 16 that the pins 84 are spaced from the plate 86 when the die is closed. It therefore follows that during the first part of the opening movement of the die, the pins 84 move with the ejector die. At this time the ejector die moves bodily toward the right in order to strip the molded cap from the cover die. This intermediate position of the die is not shown in the drawings, but it will be readily understood. As the ejector die continues its opening movement toward the right, the pins 84 reach and are stopped by the plate 86. This causes a relative movement of the slidable parts 82 outwardly of the ejector die. The outward movement ejects the molded cap from the ejector die, and dispenses with, or may be used to supplement, the action of ordinary ejector pins. Because the guides for the slidable parts 82 cause them to move angularly inward, they are disengaged from the undercuts.

The inner ends of the slidable parts 82 are, of course, laterally slidable relative to the end surfaces of the pins 84. Thus, in Fig. 16 the pins 84 bear against the inner portions of the ends of the slidable parts 82, whereas in Fig. 17 they bear against the entire end. The slidable parts have moved relatively inward or toward one another across the ends of the pins. This is also true in the die previously described, for in Fig. 7 the pins 34 bear against the outer portion of the ends of the ejectors, whereas in Fig. 13 they bear against the inner portions of the ends of the ejectors. This follows from the fact that the pins move in a direction perpendicular to the parting face of the die, while the ejectors move at an angle. The pins should therefore not be fixedly attached to the angularly slidable parts, and instead a lateral sliding movement should be permitted.

The die of Figs. 16 and 17 also has a laterally movable plug 88. The tapered portion of the plug fits in a mating recess 90, this insuring alignment of the die cavities. This is highly desirable because of the thin-walled nature of the piece being molded. Here again, the plug 88 is held by a bolt 92 which bottoms in the plug before the spring washer 94 beneath the head of the bolt is flattened. In the present case, however, the bolt 92 is eccentrically located, and this constitutes another way to prevent rotation of the plug.

Still another difference illustrated by the present die is the fact that the plug and mating recess are not circular in outline, but instead are square with rounded corners. This is illustrated in Fig. 18, which figure shows a corner portion of a large die having a number of die cavities, just as was described in connection with Figs. 2 and 3. With a large die, the self-aligning feature for the die cavities becomes of increased importance due to possibility of unequal thermal expansion of the cover die and ejector die.

The die of Figs. 16, 17 and 18 also illustrates the fact that the invention is applicable to a so-called sectional die, i. e., a die in which the main body has blank circular openings for receiving single die sections. Referring to Fig. 17, it will be seen that the main cover die body 96 has a cylindrical recess which receives a cylindrical sectional die body 98. The latter in turn has the over-sized recess 100 for somewhat movably receiving the inner part of the plug 88. The cylindrical die section 98 fits tightly in the cover die body 96, and is held tightly by a bolt 102, the lock washer of which is left sharp and is tightened, for no movement is wanted between the parts 96 and 98. In the present case the bolt 102 is centrally located, to receive any other die section in the conventional way. It is primarily for this reason that the bolt 92 is eccentrically located. Rotation of the plug 88 would be prevented by the square shape alone, without eccentrically locating the bolt 92.

In similar fashion the ejector die body 104 has a cylindrical opening 106 which receives a cylindrical die section 108. This die section has its own backing plate 110 bolted thereto, and so retains the pins 84 as a part of the die section. It will be understood that the ejector die section also bottoms appropriately in the main ejector die body. In this respect the construction may be conventional, as with ordinary sectional dies. Fig. 18 shows cylindrical sections 108 received in the main die body 104. Gate passages 112 are also indicated in Fig. 18, but these may, of course, be varied according to the needs or preferences of the particular die designer.

It is believed that the construction and operation of the present improved type of die, as well as the many advantages thereof, will be apparent from the foregoing detailed description. The specific arrangement of the die in any particular case may be varied in accordance with the nature of the piece being molded. Thus, in some cases I have found it convenient to mount the movable plug in the ejector die instead of the cover die, and in such cases the plug may itself be provided with ejector pins. In some cases the plug may be provided with a core and even with water cooling. Regular ejector pins may be used in addition to or instead of the special angularly slidable ejectors described above for making undercuts. Both the cover and ejector die portions may be provided with cores, as, for example, when molding a piece which is hollowed from both ends. On the other hand, in some cases one die portion only may have a cavity, the other die portion having only a core, as for example, when molding a thin-walled cup-shaped piece. In such case, it is important to align a core and a cavity, rather than to align a cavity with a cavity.

The convenience of using a single, deep, frustro-conical recess to align both parts of the die may be resorted to even in a case having no undercut, making it unnecessary to split or to movably mount the frustro-conical insert. One die cavity is then formed in a frustro-conical insert fixed in but shorter than the recess, leaving the outermost part of the recess vacant to receive the frustro-conical end of the plug. On the other hand, when split sections are used to provide undercuts, it is not essential that they be frustro-conical in shape. It is also not essential to use safety or surface pins to restrain the split inserts or ejectors against escape, for in some cases I have actuated these parts by means of pull-back pins which are so connected to the ejectors as to be able to both push them outwardly and pull them back.

It will therefore be apparent that while several preferred forms of the invention have been shown and described, many changes and modifications may be made in the structures disclosed, without departing from the spirit of the invention as sought to be defined in the following claims. In the claims, I have, for convenience, referred to the alignment of two "cavities," but it will be understood that this alignment may be with either a core, or a cavity, or both, in either half of the die. For comprehensive definition, the claims should, therefore, refer to a cavity or/and core in one die portion being aligned with a cavity or/and core in the other die portion, and the claims are to be so construed, even though they now refer only to "cavity" in order to avoid alternativeness.

I claim:

1. A die comprising cover and ejector portions separable on a parting face, one of said portions having a plurality of mold cavities, the other of said portions having a plurality of plugs each with a cavity complementing a mating cavity in the first portion, the said plugs being floatingly mounted in said second portion for slight self-adjustment or lateral movement thereon, means so securing said plugs to the second portion as to afford said self-adjustment or slight lateral movement of the plugs relative to the second portion, and the first portion being recessed to accurately mate with the outer ends of the plugs, whereby the cavities in the plugs are aligned with the cavities in the first portion despite unequal temperature or thermal expansion of the first and second die portions.

2. A die comprising cover and ejector portions separable on a parting face, one of said portions having a plurality of mold cavities, the other of said portions having a plurality of plugs each with a cavity complementing a mating cavity in the first portion, a portion of each of said plugs being recessed into the second portion, the said recesses in the second portion being larger in the direction of the parting face of the die than the portion of the plug received therein, thereby affording slight floating lateral movement of the plugs relative to the second portion, the outer ends of said plugs projecting beyond the parting face of the second portion, and the first portion being recessed to accurately mate with the projecting portions of the plugs, whereby the cavities in the plugs are aligned with the cavities in the first portion despite unequal temperature or thermal expansion of the cover die and the ejector die.

3. A die comprising cover and ejector die portions separable on a parting face, one of said portions having a mold cavity, the other portion having a plug with a cavity complementing the mating cavity in the first portion, means affording a self-adjustment or slight lateral movement of the plug relative to the second portion, said plug being held in the second portion by means of a bolt and spring washer, the bolt passing through an over-sized opening in said second portion in order to accommodate the aforesaid self-adjustment or lateral movement of the plug, the outer end of said plug being tapered, the first portion being slopingly recessed to accurately mate with the projecting tapered portion of the plug, whereby the cavity in the plug is aligned with the cavity in the first portion.

4. A die comprising cover and ejector die portions separable on a parting face, one of said portions having a mold cavity, the other of said portions having a plug with a cavity complementing the mating cavity in the first portion, a portion of the plug being recessed into the second portion, the recess in the second portion being larger in the direction of the parting face of the die than the portion of the plug received therein, thereby affording a slight floating lateral movement of the plug relative to the second portion, the outer portion of said plug projecting beyond the parting face of the second portion and being tapered, and the first portion being slopingly recessed to accurately mate with the projecting tapered portion of the plug, whereby the cavity in the plug is aligned with the cavity in the first portion.

5. A die comprising a cover die and an ejector die separable on a parting face, said ejector die having a plurality of mold cavities, said cover die having a plurality of plugs each with a cavity complementing a mating cavity in the ejector die, a portion of each of said plugs being recessed into the cover die, the recesses in the cover die being larger in the direction of the parting face of the die than the portion of the plug received therein, thereby affording a slight floating lateral movement of the plugs relative to the cover die, each such plug being held in the cover die by means of a bolt and spring washer, the bolt passing through an over-sized opening in order to accommodate the aforesaid self-adjustment or lateral movement of the plug, the outer portion of said plug projecting beyond the parting face of the cover die and being tapered, and the ejector die being sloping recessed to accurately mate with the projecting tapered portion of the plug, whereby the cavities in the plugs may be aligned with the cavities in the ejector die despite unequal temperature or thermal expansion of the cover die and the ejector die.

6. A die for molding a piece having an undercut when molded in the otherwise advantageous position, said die comprising a cover die and an ejector die separable on a parting face, said ejector die having a plurality of mold cavities with a slidable part with guides to move the same in angular direction relative to the parting face of the die, said angularly slidable part functioning to form the undercut in the molded piece when in inward position, but serving to free the undercut when in outward position, said cover die having a plurality of plugs each with a cavity complementing a mating cavity in the ejector die, means securing said plugs to the cover die and affording a slight lateral movement of the plugs relative to the cover die, the ejector die being recessed to mate with the outer ends of the plugs, whereby the cavities in the plugs are aligned with the cavities in the ejector die when the die is closed, and means for moving said slidable parts from inward to outward position after the ejector die has been separated from the cover die.

7. A die for molding a piece having an undercut when molded in the otherwise advantageous position, said die comprising a cover die and an ejector die separable on a parting face, said ejector die having a plurality of mold cavities, said ejector die also having slidable parts with guides to move the same in angular direction relative to the parting face of the die, said angularly slidable parts functioning to form the undercut in the molded piece when in inward position, but serving to eject the molded piece and to free the undercut when in outward position, said cover die having a plurality of plugs each with a cavity complementing a mating cavity in the ejector die, means securing said plugs to the cover die and affording a slight lateral movement of the plugs relative to the cover die, the ejector die being recessed to mate with the outer ends of the plugs, whereby the cavities in the plugs are aligned with the cavities in the ejector die when the die is closed, and means including ejector pins for bearing against the inner ends of and thereby moving said slidable parts from inward to outward position after the ejector die has been separated from the cover die and continues to move in die-opening direction.

8. A die for molding a piece having an undercut when the piece is molded in the otherwise advantageous position, said die comprising a cover die and an ejector die separable on a parting face, said ejector die having a plurality of relatively deep frustro-conical recesses each carrying a frustro-conical insert split diametrically so that the halves of said insert act as ejectors which may be separated, the axial length of said ejectors being less than that of the recesses, said ejectors being shaped to mold the desired undercut, fixed cams having sloping surfaces mating with sloping surfaces on the separable halves or ejectors in such a manner that when the ejectors are pushed outwardly they must separate, said cover die having a plurality of plugs each with a cavity complementing a mating cavity in the ejector die, means affording a slight lateral movement of the plugs relative to the cover die, the outer end of each plug being tapered or frustro-conical and dimensioned to fit accurately in the outer portion of the receptive frustro-conical recess in the ejector die, whereby the cavities in the plugs are aligned with the cavities in the ejector die when the die is closed, and means to move said ejectors outwardly after the ejector die has been separated from the cover die.

9. A die for molding a piece having an undercut when the piece is molded in the otherwise advantageous position, said die comprising a cover die and an ejector die separable on a parting face, said ejector die having a plurality of relatively deep frustro-conical recesses each carrying a frustro-conical insert split diametrically so that the halves of said insert act as ejectors which may be separated, the axial length of said ejectors being less than that of the recesses, said ejectors being shaped to mold the desired undercut, fixed cams having sloping surfaces mating with sloping surfaces on the separable halves or ejectors in such a manner that when the ejectors are pushed outwardly they must separate, said cover die having a plurality of plugs each with a cavity complementing a mating cavity in the ejector die, means affording a slight lateral movement of the plugs relative to the cover die, the outer end of each plug being tapered or frustro-conical and dimentioned to fit accurately in the outer portion of the receptive frustro-conical recess in the ejector die, whereby the cavities in the plugs are aligned with the cavities in the ejector die when the die is closed, and means including ejector pins the ends of which bear against the inner ends of said ejectors and function to move said ejectors outwardly after the ejector die has been separated from the cover die and continues to move in the die-opening direction.

10. A die for molding a piece having an undercut when the piece is molded in the otherwise advantageous position, said die comprising a cover die and an ejector die separable on a parting face, said ejector die having a plurality of relatively deep frustro-conical recesses each carrying a frustro-conical insert split diametrically so that the halves of said insert act as ejectors which may be separated, the axial length of said ejectors being less than that of the recesses, said ejectors being shaped to mold the desired undercut, fixed cams having sloping surfaces mating with sloping surfaces on the separable halves or ejectors in such a manner that when the ejectors are pushed outwardly they must separate, said cover die having a plurality of plugs each with a cavity complementing a mating cavity in the ejector die, a portion of said plugs being recessed into the cover die, the recesses in the cover die being larger in the direction of the parting face than the portion of the plugs received therein, thereby affording a slight lateral movement of the plugs relative to the cover die, the outer portion of each plug projecting beyond the parting face of the cover die, and being tapered or frustro-conical and dimensioned to fit accurately in the outer portion of the receptive frustro-conical recess in the ejector die, whereby the cavities in the plugs are aligned with the cavities in the ejector die when the die is closed, and means to move said ejectors outwardly after the ejector die has been separated from the cover die.

11. A die for molding a piece having an undercut when the piece is molded in the otherwise advantageous position, said die comprising a cover die and an ejector die separable on a parting face, said ejector die having a plurality of relatively deep frustro-conical recesses each carrying a frustro-conical insert split diametrically so that the halves of said insert act as ejectors which may be separated, the axial length of said ejectors being less than that of the recesses, said ejectors being shaped to mold the desired undercut, fixed cams having sloping surfaces mating with sloping surfaces on the separable halves or ejectors in such a manner that when the ejectors are pushed outwardly they must separate, said cover die having a plurality of plugs each with a cavity complementing a mating cavity in the ejector die, a portion of said plugs being recessed into the cover die, the recesses in the cover die being larger in the direction of the parting face than the portion of the plugs received therein, thereby affording a slight lateral movement of the plugs relative to the cover die, the outer portion of each plug projecting beyond the parting face of the cover die, and being tapered or frustro-conical and dimensioned to fit accurately in the outer portion of the receptive frustro-conical recess in the ejector die, whereby the cavities in the plugs are aligned with the cavities in the ejector die when the die is closed, and ejector pins the ends of which bear against the inner ends of the aforesaid ejectors and function to move said ejectors outwardly.

12. A die for molding a piece having a thread which constitutes an undercut when the piece is molded in the otherwise advantageous position, said die comprising a cover die and an ejector die separable on a parting face, said ejector die having a plurality of relatively deep frustro-conical recesses each carrying a frustro-conical insert split diametrically so that the halves of said insert act as ejectors which may be separated, the axial length of said ejectors being less than that of the recesses, said ejectors being shaped to mold the desired thread, fixed cams having surfaces which slope at the angle of the frustro-conical recess and which mate with sloping surfaces on the separable halves or ejectors in such a manner that when the ejectors are pushed outwardly they must separate, said cover die having a plurality of plugs each with a cavity complementing a mating cavity in the ejector die, a portion of said plugs being recessed into the cover die, the recesses in the cover die being larger in the direction of the parting face than the portion of the plugs received therein, thereby affording a slight lateral movement of the plugs relative to the cover die, the outer portion of each plug projecting beyond the parting face of the cover die, and being tapered or frustro-conical and dimensioned to fit accurately in the outer portion of the receptive frustro-conical recess in the ejector die, whereby the cavities in the plugs are aligned with the cavities in the ejector die when the die is closed, and ejector pins connected to an ejector plate, the ends of said ejector pins bearing against the inner ends of the aforesaid ejectors and functioning to move said ejectors outwardly after the ejector die has been separated from the cover die and continues to move in the die-opening direction.

13. A die comprising cover and ejector die portions separable on a parting face, one of said portions having a plurality of relatively deep frustro-conical recesses each carrying a frustro-conical insert, the axial length of said insert being less than that of the recess, thus leaving a frustro-conical recess at the parting face, mold cavities in said inserts, the other of said die portions having a plurality of plugs having cavities complementing mating cavities in the inserts, means so mounting the plugs as to afford lateral movement of the plugs in the direction of the parting face, the outer ends of the plugs being frustro-conical in shape and projecting beyond the parting face of the second die portion and being so dimensioned as to accurately fit in frustro-conical recesses in the first die portion, the arrangement being such that the cavities in the plugs are aligned with the cavities in the first die portion when the die is closed.

14. A die comprising cover and ejector die portions separable on a parting face, one of said portions having a plurality of relatively deep frustro-conical recesses each carrying a frustro-conical insert, the axial length of said insert being less than that of the recess, thus leaving a frustro-conical recess at the parting face, mold cavities in said inserts, the other of said die portions having a plurality of plugs having cavities complementing mating cavities in the inserts, a portion of each of said plugs being cylindrical and being recessed into a cylindrical recess in the second die portion, said cylindrical recesses in the second portion being larger in diameter than that of the plugs in order to afford lateral movement of the plugs in the direction of the parting face, the outer ends of the plugs being frustro-conical in shape and larger in diameter than the cylindrical inner ends of the plugs, said outer ends of the plugs projecting beyond the parting face of the second die portion and being so dimensioned as to accurately fit in frustro-conical recesses in the first die portion, the outer ends of said plugs bearing against the outer ends of said inserts, the arrangement being such that the cavities in the plugs are ligned with the cavities in the first die portion when the die is closed, and despite unequal temperature or thermal expansion of the cover and ejector die portions.

HOWARD W. BARTHOLOMEW.